United States Patent [19]
Morgan

[11] 3,843,192
[45] Oct. 22, 1974

[54] STANDING PASSENGER SUPPORT STRUCTURE FOR A MOVING VEHICLE
[75] Inventor: Edgar A. Morgan, Palo Alto, Calif.
[73] Assignee: Arrow Development Co., Inc., Mountain View, Calif.
[22] Filed: May 16, 1973
[21] Appl. No.: 360,795

[52] U.S. Cl............ 296/64, 105/344, 105/457, 256/1, 272/1 R, 296/1 R
[51] Int. Cl............................................. B60n 3/02
[58] Field of Search........ 296/1 R, 64, 71; 105/344, 105/354, 439, 457, 458, 459, 461; 272/1 R, 57 A; 297/183, 244; 248/118; 280/150 B

[56] References Cited
UNITED STATES PATENTS

| | | | |
|---|---|---|---|
| 392,015 | 10/1888 | Deyell et al............. | 105/457 |
| 594,296 | 11/1897 | Stott...................... | 297/244 |
| 761,737 | 6/1904 | Wellman................. | 105/344 |
| 768,896 | 8/1904 | Fleischman.............. | 105/344 |
| 1,003,378 | 9/1911 | Sholes.................... | 105/344 |
| 1,409,751 | 3/1922 | Miller.................... | 105/457 |
| 3,576,331 | 4/1971 | Greene................... | 280/18 X |

Primary Examiner—Robert J. Spar
Assistant Examiner—Leslie J. Paperner
Attorney, Agent, or Firm—Limbach, Limbach & Sutton

[57] ABSTRACT

A vertically extending surface that forms undulations or pockets above a floor of a vehicle for receiving the body of a standing passenger to support him in more than one direction against horizontal movement resulting from the movement of the vehicle. Such a standing passenger support is positioned in the middle of a vehicle with passenger seats being around the outside of the vehicle.

7 Claims, 2 Drawing Figures

PATENTED OCT 22 1974

3,843,192

STANDING PASSENGER SUPPORT STRUCTURE FOR A MOVING VEHICLE

BACKGROUND OF THE INVENTION

This invention relates generally to passenger vehicles and more particularly to a structure for supporting a standing passenger against accelerations and sway of a vehicle.

Many amusement parks, National Parks and the like provide for tours with small vehicles that are generally open and designed for slow speed travel so that the passengers therein may observe the surroundings. Such a vehicle may be self-powered or a plurality of such vehicles may be linked together in a train which is pulled behind a tractor. Some existing commercial vehicles provide overhead straps as handholds for standing passengers but this is uncomfortable because the hand restraint is substantially above the passenger's center of gravity.

It is the primary object of the present invention to provide a comfortable support against which standing passengers may lean in these and other types of passenger vehicles to increase the standing passenger comfort.

SUMMARY OF THE INVENTION

This and additional objects are accomplished by the present invention wherein a rigid structure is provided above the floor of the vehicle at about the hip level of human passengers and having undulations along its length when viewed in a plane parallel to the floor in order to provide pockets for receiving one or more passengers. The result is that a passenger within a pocket formed in the undulating structure is supported against being thrown in several directions. A straight passenger hand rail structure now in use only provides support against being thrown in one direction against the bar. Such an undulating passenger support structure may be oriented in any number of ways with respect to the vehicle direction of travel.

Additional objects, advantages and features of the present invention will become apparent from the following description of a preferred embodiment thereof which should be taken in conjunction with the accompanying drawings.

DESCRIPTION OF THE PREFERRED EMBODIMENT

Figure 1:
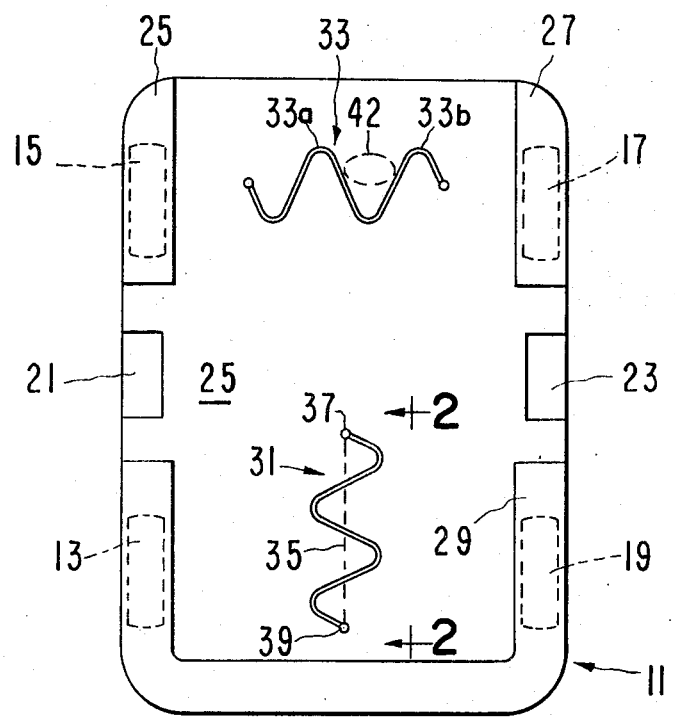
FIG. 1 is a plan view of the vehicle with a passenger support structure according to the present invention.

A vehicle 11 (FIG. 1) is shown to include four wheels 13, 15, 17 and 19 upon which the vehicle rides on an ordinary road. Other types of vehicles, such as boats and rail riding vehicles, can be provided with the standing passenger support of the present invention with the same advantages. A pair of steps 21 and 23 on opposite sides of the vehicle 11 of the specific example being illustrated lead up to a level floor 25 for passenger access thereto. Passenger seats 25 and 27 are provided along opposite sides of the vehicle at one end thereof. The vehicle 11 includes a continuous passenger seat 29 extending from one side around an end of the vehicle and partially along an opposite side of the vehicle.

Two substantially identical standing passenger supports 31 and 33 are provided in the interior section of the vehicle. The support 31 may have an imaginary axis 35 defined between two rigid support posts 37 and 39 at its ends. The axis 35 is oriented in the predominant direction of travel of the vehicle 11 while a similar axis between ends of the second passenger support 33 is oriented substantially orthogonal to this predominant direction of motion. Each of the supports 31 and 33 contains undulations of a size in which passengers such as a passenger 41 may stand. By making this surface shape (as viewed in a plane parallel to the floor 25) periodically varying and symmetrical about its axis 35, a strong structure is provided with undulations on both sides thereof so that passengers may contact both sides of the supporting surface.

It will be noted that the passenger 41 who is leaning against the support surface is surrounded substantially on three sides by the supporting surface 33 and thus is supported against motion in a number of directions. Undesirable passenger motion can result from sudden stops, with accelerating forward movement or from swaying of the vehicle from side to side such as when it goes around a corner. The comfort of the passenger is increased if he is held against these movements in more than just a single direction that is provided by an existing conventional straight support surface or bar.

Figure 2:
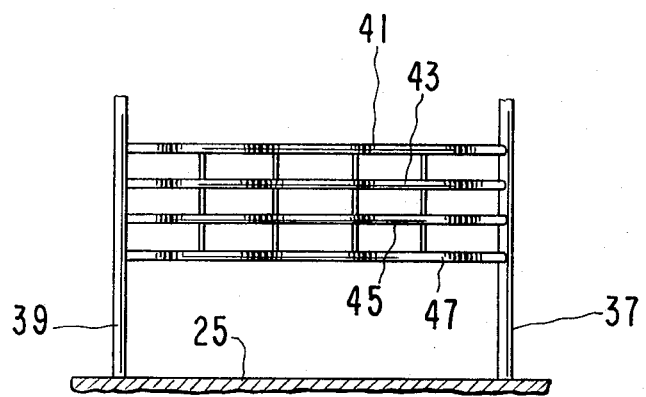
FIG. 2 is an upright view of a passenger support structure taken across Section 2—2 of FIG. 1.

Referring to FIG. 2, a preferred vertical structure of the supporting surfaces 31 and 33 is illustrated. Each includes four rails. Each rail lies in a plane that is substantially parallel to the floor 25. These four rails 41, 43, 45 and 47 are rigidly attached at their opposite ends to the support posts 37 and 39 with the addition of vertical spacers between these extreme ends. The total distance from the bottom of the bottom rail 47 to the top of the top rail 41 is conveniently about one and one-half feet or so. The elevation of the top rail 41 with respect to the floor 25 is waist high so that a standing passenger can conveniently rest his or her hand thereon. The lower rails 43, 45 and 47 may be replaced with a single unitary undulating formed plastic or fiberglass structure rather than being broken into the three rails shown. However, multiple bars are preferred and have the advantage that younger and smaller persons may also have convenient hand holds in the lower bars 43, 45 or 47.

The undulating shape of the support structures 31 and 33 in plan view may be any specific shape that permits substantial enclosure of a passenger by an undulation. The support structure shown in FIG. 1 is shaped to include substantially straight line segments that traverse back and forth across the imaginary axis between the end posts, these straight line segments being joined by curved portions. These straight line segments make a structure easier to construct but a sinusoidal variation or some similar shape could also be employed.

The period of this undulating structure, such as the distance between the points 33a and 33b of the support 33, should be a minimum of about 1 or 1½ feet and a maximum of 3 or 4 feet. The goal is to provide support on several sides of a normal sized human passenger that is standing within an undulation.

Although the present invention has been described with respect to a specific example thereof, it will be un-

I claim:

1. A movable passenger vehicle comprising a rigid structure associated with a floor for supporting standing passengers against movement in at least two generally orthogonal horizontal directions, said structure comprising a surface supported in a position substantially perpendicular to the floor an elevated distance therefrom in the region of human hips by rigid posts extending between the floor and the surface at its ends, said surface undulating in a direction along its length in a projection on the floor, the undulations including a plurality of continuous full cycles symmetrically positioned about an imaginary axis extending between said two supporting posts, the resulting undulations being broad enough to receive a standing human body shape at least a partial way therein.

2. The passenger vehicle according to claim 1 wherein said structure includes a rail on the top thereof along its length and undulating therewith for hand gripping by passengers standing therealong.

3. The passenger vehicle according to claim 1 wherein said rigid structure is made of a plurality of generally horizontally extending rails spaced apart vertically across the vertical extent of said surface.

4. The vehicle of claim 1 wherein said imaginary axis is oriented generally parallel to the predominant direction of motion of said vehicle.

5. The vehicle of claim 1 wherein said imaginary axis is oriented generally perpendicular to the predominant direction of motion of said vehicle.

6. The passenger vehicle according to claim 1 wherein said passenger supporting surface is located generally to the interior of said vehicle while passenger seats are provided around a surrounding exterior edge of said passenger vehicle floor.

7. A moving vehicle having a rigid passenger supporting structure above a floor, the passenger support comprising a surface extending horizontally a length in the interior of said vehicle with a plurality of full undulating cycles back and forth across an imaginary line extending along its length as viewed as a projection onto the floor, said undulations having a magnitude to receive a standing passenger for support in several horizontal directions, said support being shaped and positioned in the vehicle to permit passengers to stand on both sides thereof.

* * * * *